(12) United States Patent
Amigh et al.

(10) Patent No.: US 6,626,996 B1
(45) Date of Patent: Sep. 30, 2003

(54) PIZZA SAUCE DISPENSING DEVICES AND METHODS

(75) Inventors: Steven Amigh, Plano, TX (US); Homero Ortegon, Carrollton, TX (US)

(73) Assignee: Pizza Hut, Inc., Dallas, TX (US)

( * ) Notice: Subject to any disclaimer, the term of this patent is extended or adjusted under 35 U.S.C. 154(b) by 0 days.

(21) Appl. No.: 09/525,190

(22) Filed: Mar. 14, 2000

(51) Int. Cl.⁷ .............................................. B05C 11/10
(52) U.S. Cl. ...................... 118/681; 118/680; 118/683; 118/684; 118/679; 118/695; 118/696; 118/24; 118/13
(58) Field of Search ........................... 118/13, 695, 698, 118/704–705, 308, 310, 313, 24, 52, 712, 713, 669, 679, 680, 681, 683, 684, 686; 426/302; 99/450.1–450.7, 516

(56) References Cited

U.S. PATENT DOCUMENTS

| | | | |
|---|---|---|---|
| 2,073,731 A | | 3/1937 | Christiansen |
| 3,358,618 A | | 12/1967 | Vetta |
| 3,602,154 A | * | 8/1971 | Schimkat et al. ........... 107/1 R |
| 3,631,818 A | | 1/1972 | Zito |
| 3,751,198 A | * | 8/1973 | Tanara ......................... 425/100 |
| 4,173,942 A | | 11/1979 | Plattner |
| 4,882,475 A | * | 11/1989 | Miller et al. ................. 235/383 |
| 5,117,749 A | * | 6/1992 | Bakker ......................... 99/450 |
| 5,121,677 A | * | 6/1992 | Le Claire et al. ............. 118/18 |
| 5,445,674 A | * | 8/1995 | DeMars ....................... 118/669 |
| 5,540,943 A | | 7/1996 | Naramura | 
| 5,695,817 A | * | 12/1997 | Tateyama et al. ........... 427/240 |
| 5,921,170 A | * | 7/1999 | Khatchadourian et al. .... 99/349 |
| 5,960,225 A | * | 9/1999 | Fujimoto .................... 396/611 |
| 5,962,070 A | * | 10/1999 | Mitsuhashi et al. ......... 427/240 |
| 5,997,924 A | * | 12/1999 | Olander, Jr. et al. ........ 426/296 |
| 6,113,697 A | * | 9/2000 | Kim et al. .................... 118/696 |

FOREIGN PATENT DOCUMENTS

| | | |
|---|---|---|
| DE | 38 10 298 | 10/1989 |
| WO | 90/13229 | 11/1990 |
| WO | 98/04137 | 2/1998 |
| WO | 99/48373 | 9/1999 |

* cited by examiner

Primary Examiner—Richard Crispino
Assistant Examiner—George R. Koch, III
(74) Attorney, Agent, or Firm—Dicke, Billig & Czaja, PLLC

(57) ABSTRACT

A pizza sauce dispenser simultaneously dispenses and spreads a precisely controlled amount of sauce onto a pizza dough base without manually handling the sauce or the dough during operation. The dispenser includes a selectively rotatable disc and an arm that selectively extends over the disc. At lease one nozzle is supported by the arm and selectively dispenses the sauce onto the dough. A control mechanism controls: (1) a selected rate and direction of disc rotation; (2) a selected pivot rate and direction of the arm; and/or (3) a selected rate of dispensing sauce through the nozzle. In use, with pizza dough placed on the disc, the disc is rotated and the arm pivoted over the dough so that the nozzle traverses a path from the outside edge of the dough to the center of the dough or vice versa. Sauce thus is deposited in a spiral or other desirable pattern.

38 Claims, 6 Drawing Sheets

PIZZA SAUCE DISPENSING DEVICES AND METHODS

BACKGROUND OF THE INVENTION

1. Field of the Invention

The present invention relates to equipment for making food items, and, more particularly, to pizza-making equipment, specifically to pizza sauce dispensers and methods of dispensing pizza sauce.

2. Description of Related Art

Commercial kitchens and restaurants face the challenge of making large quantities of food items while maintaining the individual quality of each item prepared. For example, in a pizza restaurant, hundreds of pizzas are made daily. Naturally, this volume requires manually repeating the same preparation tasks (e.g., rolling or otherwise preparing dough, spreading sauce, adding toppings, etc.) over and over again. Manually applying and spreading sauce, however, leads to variability in the amount of sauce applied as well as variability in the spreading pattern.

In other environments, such as a frozen pizza factory where thousands of pizzas are made daily, many of these repetitive tasks are automated. For example, a sauce dispenser is used to apply pizza sauce onto a pizza crust (e.g. unbaked dough flattened out to its desired shape and size). The dispenser deposits a predetermined amount (e.g. five ounces) of sauce onto the pizza crust. Such dispensers typically have a single sauce dispensing head and are sized to apply a single-sized portion of sauce. In other words, the dispensing head is capable of dispensing only a single volume of sauce, such as five ounces, rather than being capable of dispensing variable volumes, such as two ounces, three ounces, or even eight ounces of sauce.

While generally useful in a factory setting, these types of dispensers are not helpful in a restaurant setting where many different sized pizzas (e.g., ten inch, twelve inch, sixteen inch diameter) are made, each requiring a different amount of sauce. If these factory-type sauce dispensers were used in the restaurant setting, a food service operator would be forced to change the dispensing head each time a different sized pizza was made. This required changeover would defeat any intended gains in efficiency. Moreover, in the restaurant setting, there are several types of pizza with different types of dough and different types of sauce. Since different sauces typically have different viscosities, a different dispensing head likely would be necessary since the flow rate of the conventional dispensing heads is fixed.

While conventional sauce dispensing machines are capable of putting sauce on the pizza dough, the sauce still must be spread over the dough. In the factory setting, the typical conventional sauce dispenser drops a single dollop of sauce in the center of the dough and an automated roller rolls across the dough to spread the sauce about the surface of the dough. The roller frequently accumulates particulates from the sauce and dough, compromising the effectiveness of the roller and the appearance of the pizza. Moreover, a different roller is generally necessary for a different type sauce, to avoid cross-contamination of different sauces on the roller. Alternatively, in the retail restaurant setting, a food service operator spreads the sauce manually by hand, such as with a spoon or other cooking utensil.

In the retail pizza business, using a roller or spoon to spread the sauce is undesirable since manual pressure applied against the pizza dough can damage the dough. This effect is particularly noticeable for pan pizza dough, which is very delicate. Undue pressure on this dough pushes air out of the dough, causing it to flatten and possibly harden in the area of contact. Of course, this type of damage is noticeable by the consumer and therefore is undesirable.

Another conventional method of dispensing pizza sauce includes using a large multi-port dispensing head that sits over and above the pizza dough. Sauce drips through the ports, which are in a dot matrix or honeycomb pattern, down onto the dough. Unfortunately, selected portions of the multiple ports cannot be selectively deactivated, which would permit control over the pattern and volume of sauce applied to each pizza. Accordingly, this type of conventional, multi-port dispensing head is suitable only for saucing a single-sized pizza. A differently sized dispensing head or different machine would be required for each differently sized pizza. In addition, the ports tend to drip sauce even after the saucing operation is terminated, and the ports typically clog, thereby requiring frequent maintenance.

Accordingly, conventional methods of applying sauce to pizza crusts in the restaurant setting suffer from several disadvantages. First, manual application and spreading of the sauce leads to variability in the volume of sauce applied and can damage the crust. Second, dispensing sauce through a factory-type sauce dispenser is impractical, because the conventional dispensing heads permit dispensing only a single volume of sauce (e.g., six-ounce portions only) and do not assist in spreading the sauce. Moreover, the rollers available in the factory setting damage some delicate crusts while spreading and present contamination issues where different types of sauces are used. Consequently, conventional factory-type sauce dispensers do not provide the desired efficiencies in the retail restaurant setting, and current manual preparation techniques remain inefficient and lead to variable quality.

SUMMARY OF THE INVENTION

A pizza sauce dispenser, according to an embodiment of the invention, simultaneously dispenses and spreads a precisely controlled amount of sauce onto a pizza dough base without requiring a food service operator to manually handle the sauce or the dough during operation. According to one embodiment, the dispenser includes a selectively rotatable disc, an arm that selectively pivots over the disc, and a spraying mechanism for spraying sauce onto the disc (or a pizza dough base on the disc). The rotatable disc includes a surface adapted to receive a pizza pan with dough thereon, for example. A nozzle of the spraying mechanism is disposed on an end of the arm and selectively deposits sauce onto the dough. Sauce is supplied to the nozzle by the remainder of the spraying mechanism, including a pumping system and reservoir. A control mechanism coordinates activation and deactivation of the rotatable disc, the pivotable arm, and the nozzle, and/or one or more of the following: (1) a selected rate of disc rotation; (2) a selected rate and selected directional pivoting of dispensing arm; and (3) a selected rate of dispensing sauce through the nozzle.

To sauce a pizza dough base, a pizza dough/crust is placed on the disc, the disc is rotated and the dispensing arm can be pivoted simultaneously, so that the nozzle strikes a path from the outer edge of the dough to the center of the dough. While the arm is pivoting over the rotating dough (set on the disc), sauce is sprayed from the nozzle onto the dough, forming a spiral sauce pattern on the dough.

The rotatable disc preferably includes a surface having a plurality of nested, concentric rings that match pizzas of different diameters, to permit the disc to instantly accept different sized pizza pans and/or dough bases. In addition, the concentric ring pattern results in automatic centering of the pizza pan (and dough thereon) on the sauce dispenser.

The sauce dispensing system optionally includes a second spraying mechanism having a second nozzle, which also is mounted on the end of the pivoting arm, and a second pumping system with its own reservoir. This additional spraying mechanism permits instantaneous access to a second, different type of pizza sauce without requiring any changeover of the first spraying mechanism.

Accordingly, a pizza sauce dispenser, according to an embodiment of the invention, automatically applies and spreads sauce onto a pizza dough for many different sized pizzas and multiple sauces, without requiring complicated changeovers of a dispensing head or other equipment, and without a roller, as is generally required with conventional sauce dispensers. Moreover, the sauce dispenser alleviates time pressure and the variable quality associated with pizzas that are sauced manually by food service operators.

BRIEF DESCRIPTION OF THE DRAWINGS

Embodiments of the invention will be described with reference to the figures, in which like reference numerals denote like elements and in which.

DETAILED DESCRIPTION OF PREFERRED EMBODIMENTS

Figure 1:
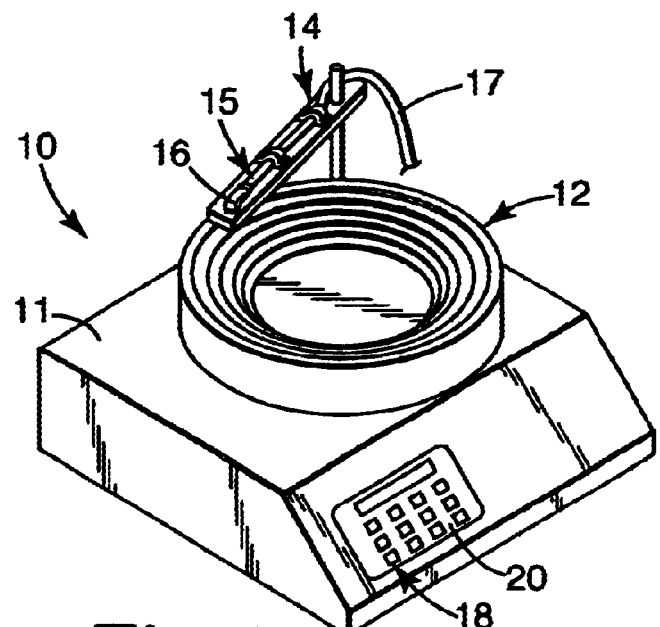
FIG. 1 is a perspective view of a pizza sauce dispenser, according to an embodiment of the invention.

A pizza sauce dispensing system 10, according to an embodiment of the invention, is shown generally in FIG. 1. System 10 includes base 11, selectively rotatable disc 12, dispensing arm 14, which is selectively pivotable according to one embodiment, dispensing or spraying mechanism 15 with nozzle 16 and hose 17, and controls 18 having display/keypad 20. Rotatable disc 12 is adapted to receive a pizza pan, with a pizza crust thereon. Spraying mechanism 15 also includes a pumping system and sauce reservoir (not shown) for supplying pizza sauce to nozzle 16.

Figure 2:
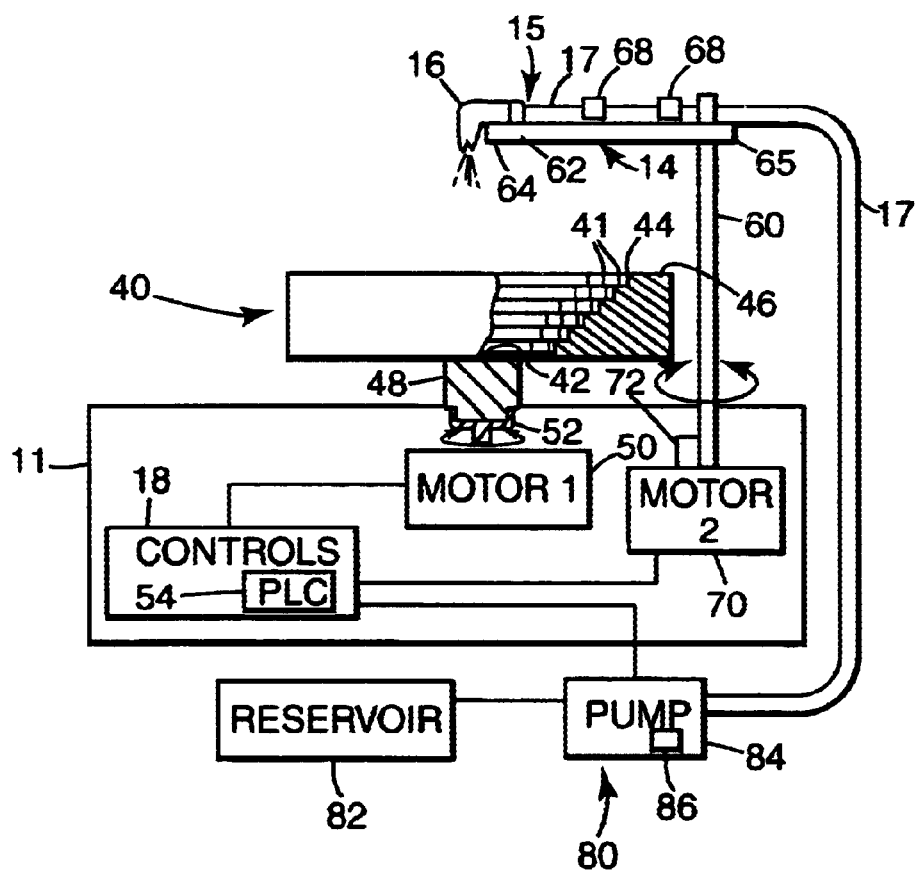
FIG. 2 is a schematic illustration, with sectional views, of the pizza sauce dispenser of FIG. 1, according to an embodiment of the invention.

FIG. 2 is a schematic illustration of pizza sauce dispensing system 10. As shown in FIG. 2, rotatable disc 12 includes tray 40 having an upper surface of nested, concentric rings 41, center 42 and outer edge 44 with rim 46. Rotatable disc 12 further includes motor engagement member 48. In association with disc 12, base 11 of system 10 further includes motor 50 having receptacle 52 for receiving base engagement member 48. Motor 50 is in electrical and operative communication with controls 18 and programmable logic controller (PLC) 54.

Dispensing arm 14 further includes vertical support 60, horizontal member 62, first end 64, second end 65, and fasteners 68. In association with arm 14, base 11 of system 10 further includes motor 70 and sensor 72, which are both in electrical and operative communication with controls 18 and PLC 54.

As also shown in FIG. 2, spraying mechanisim 15 further includes pump system 80 that supplies nozzle 16 with pizza sauce. Pump system 80 includes reservoir 82 and pump 84 having optional drawback cylinder 86. Pump 84 is in electrical and operative communication with controls 18 and PLC 54. Reservoir 82 is preferably refrigerated to lengthen the storage time of the pizza sauce.

Rotatable disc 12 is removably attached to motor 50 and supported on base 11 via engagement member 48, which is removably inserted in receptacle 52. Motor 50 is preferably a stepper motor, or a motor known in the art for permitting selective clockwise or counterclockwise rotation of disc 12 relative to base 11. Motor 50 can operate independently (e.g. as a direct drive motor for turntables) or in association with other motors and/or belts and pulleys, as known in the art, for providing selective rotation of disc 12. Motor 50 receives commands from controls 18 and PLC 54 to determine the activation, deactivation, acceleration, and deceleration of rotation of disc 12, particularly in relationship to the operation of dispensing arm 14 and spraying mechanism 15.

Dispensing arm 14 is pivotally mounted relative to base 11, according to one embodiment. In particular, vertical support 60 is mounted to, and extends upwardly from, motor 70 of base 11. Motor 70 is preferably a stepper motor and is capable of causing rotation of vertical support 60 in either a clockwise or counterclockwise rotation. As with motor 50, motor 72 also can be another type motor that operates independently (e.g. a direct drive motor) or in association with accompanying belts, pulleys, etc., as known in the art, to achieve selective control over the activation, deactivation, acceleration, deceleration and the rate and direction of rotation of vertical support 60. Sensor 72 acts in cooperation with motor 70 and PLC 54 to control the extent and direction of pivoting of vertical support 60.

Horizontal member 62 of dispensing arm 14 is connected to vertical support 60 in a generally perpendicular relationship, so that horizontal member 62 extends over rotatable disc 12. Horizontal member 62 has a length (e.g. up to about ten inches) to ensure that first end 64 will be disposed over or adjacent to center 42 of tray 40 for the largest pizza (e.g. with a sixteen inch diameter dough base) that can be set in tray 40 of rotatable disc 12. Vertical support 60 has a length sufficient to ensure that horizontal member 62 is vertically spaced from rotatable disc 12. Horizontal member 62 also carries hose 17 along its length and fasteners 68 for securing hose 17 on member 62 from its first end 64 to second end 64, and for securing nozzle 16 at second end 65.

Nozzle 16 of spraying mechanism 15 receives sauce for spraying or otherwise dispensing onto the pizza dough base via hose 17 and pumping system 80. Pumping system 80 can comprise a commercially available condiment pumping system that includes a pump, regulator(s), air solenoid, and/or drawback cylinder, for example. Reservoir 82, which preferably holds a large volume of sauce, is operably coupled to pump 84. Drawback cylinder 86 is an optional component of system 80 and causes sauce to evacuate from nozzle 16 through hose 17 after pump 84 is deactivated to prevent dripping and clogging of sauce at nozzle 16. Other pumping systems known in the art that provide the functions described herein can be readily used.

Pump 84 is activated and deactivated selectively, and its flow rate controlled, by PLC 54 and controls 18. Pumping system 80 also optionally includes a stepper motor that is incorporated into pump 84, or operates in association with pump 84, to facilitate control of a variable flow rate of sauce through hose 17 and nozzle 16. For example, with this feature, it is believed the flow rate may be automatically decreased when less sauce is needed at a given location on the pizza crust (e.g. center) or increased when more sauce is needed at other locations on the pizza crust (e.g. outer edge).

Figure 3:
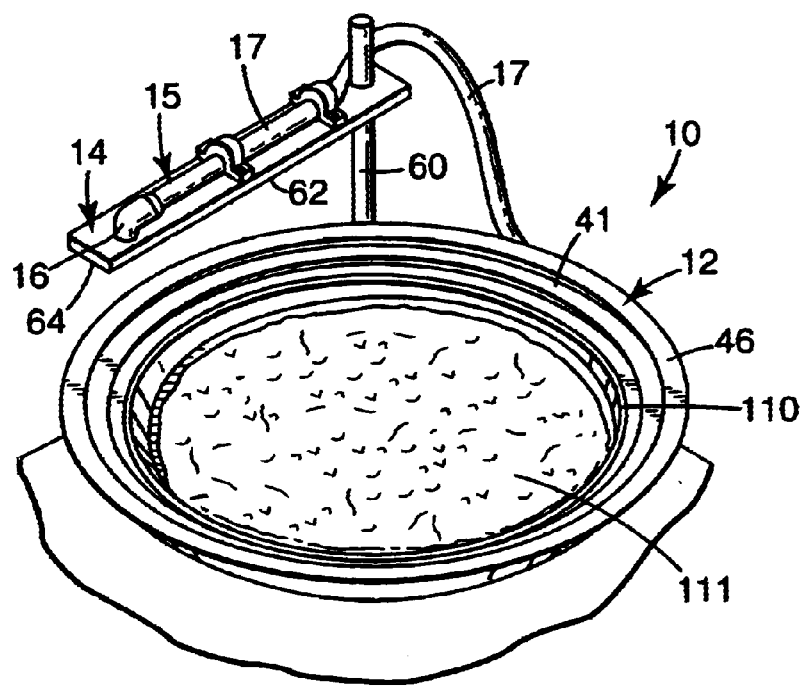
FIG. 3 is an enlarged perspective view of the dispenser of FIG. 1, according to an embodiment of the invention, and further incorporating a small pizza pan with dough.

FIG. 3 shows dispensing arm 14 of sauce dispensing system 10 in a storage mode, and illustrates the automatic pan-centering feature of system 10. Arm 14 is stationed adjacent to outer edge of disc 12. A smaller size pan 110 with dough 111 thereon, such as a pan for a personal pan pizza, is placed concentrically relative to center 42 of nested rings 41. Each one of the rings 41 is sized with a predetermined diameter and generally has a circular shape, to accommodate a predetermined size and shape of a pan, such as pan 110. Since rings 41 are concentrically arranged, once pan 110 is set within its matching diameter-sized ring 41, pan 110 is automatically centered on rotatable disc 12.

Figure 4:
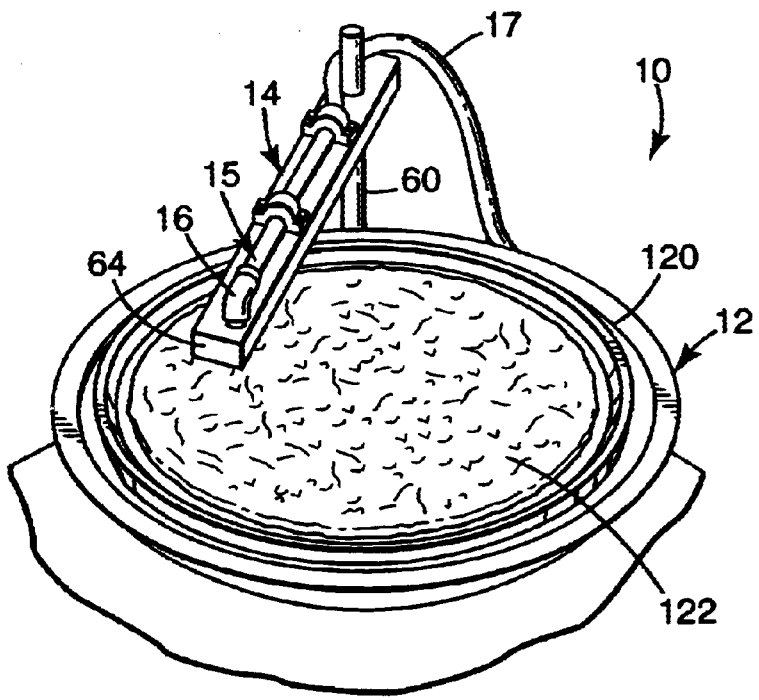
FIG. 4 is a perspective view of the dispenser of FIG. 1, according to an embodiment of the invention, and further incorporating a large pizza pan with dough.

FIG. 4 shows sauce dispensing system 10 just prior to use, according to one embodiment. In this example, a larger size pan 120 with dough 122 is set on rotatable disc 12, in one of the rings 41 that matches the diameter of pan 120. Pan 120 is automatically centered, as described above, by the concentricity of rings 41.

Using controls 18, a saucing operation is started. In particular, the diameter size of pan 120, type and volume of sauce, and type of dough is identified at controls 18 (as well as other parameters). Optimally, this identification at controls 18 occurs by pressing a single key on keypad 20 or via bar code scanning, as will be further described. This information is entered into, or recalled from memory, in PLC 54. PLC 54 then identifies several parameters regarding the saucing operation for that identified pizza, including a starting location adjacent the outer edge on the dough and an ending location adjacent the center of the dough. Additional parameters of the pre-programmed operation can include: (1) the total time, rate, and/or direction that disc 12 rotates throughout the operation; (2) the total time, rate, and/or direction (counterclockwise or clockwise) that arm 14 pivots over disc 12; and (3) the total time, rate, and time of initiation and termination of sauce flowing through nozzle 16 of spraying mechanism 15.

PLC 54 is programmed for these parameters using well known principles of kinematics for a rotating disc, pivoting arm, and vertically dropping liquid, for example including the use of the following equations:

$$W=2\pi N/60=0.10472\,N \text{ (in rad/sec), where } N=\text{RPM, and} \quad (1)$$

$$T=2\pi/\omega, \text{ where T is equal to the time required to complete one full cycle.} \quad (2)$$

Using the pressure of the sauce spraying mechanism 15, the volume of sauce to be sprayed, the desired sauce pattern on the pizza, and the above equations and familiar kinematic principles, a program for activation, deactivation, and rate control of rotatable disc 12, pivotable arm 14, and spraying mechanism 15 is stored in PLC 54 for later activation. Ideally, each program for a given pizza results in the time to complete one cycle, including the time to sauce a pizza, being less than nine seconds.

After this information is registered in PLC 54 for saucing the dough on pan 120, operation begins with arm 12 pivoting so that nozzle 16 is located at a predetermined site above dough 122 adjacent an outer edge 131 of dough 122 (e.g., one-quarter inch from an outer edge of the pizza). In a single step, according to one embodiment, disc 12 begins rotating as arm 12 pivots inward and sauce sprays out of nozzle 16 onto dough 122.

Figure 5:
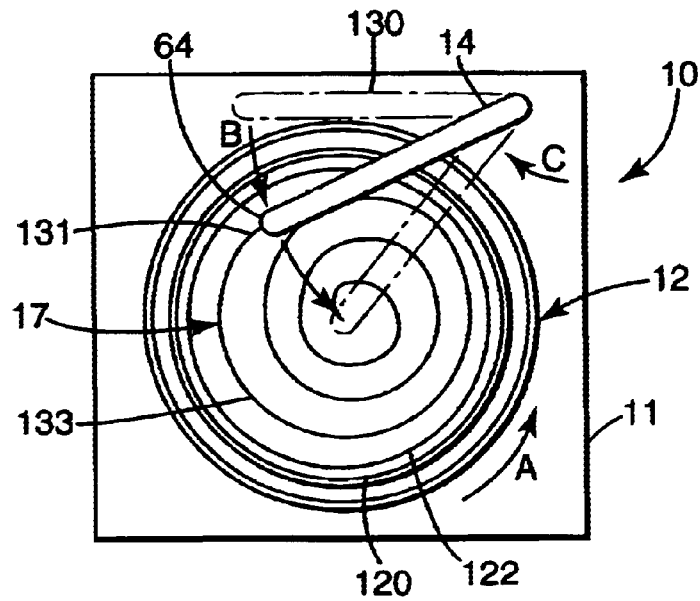
FIG. 5 is a top, generally schematic illustration of the dispenser of FIG. 1 in operation, according to an embodiment of the invention.

FIG. 5 schematically illustrates the interaction of disc 12 and arm 14 as sauce 17 is deposited on dough 122 (resting on tray 40 of rotatable disc 12). While sauce is being deposited on dough 122, disc 12 rotates in a counterclockwise direction (identified by directional arrow A) and arm 14 pivots in a counterclockwise direction (directional arrow B) from an outer position 130 (identified by phantom lines) adjacent outer edge 131 of dough 122 to a center position 132 adjacent center 42 of disc 12 and/or dough 122. If desired, sauce 17 also can be deposited when arm 14 pivots from its center position 132 to outer position 130. This return movement is identified by directional arrow C. As seen in e.g. FIG. 5, this operation results in sauce 17 forming a spiral pattern 133 on dough 122.

As described above, PLC 54 is programmed so that an exact start location and an ending location of arm 14, as well as other identified parameters, during the saucing operation are used for each differently sized pizza, type of pizza and type of sauce. For example, a twelve-inch pan pizza might require about 4.25 ounces of sauce to be deposited over a dough having a surface area diameter of about 10.5 inches. In addition, the pan pizza might require that saucing start about one-quarter inch from outer edge 131 of the dough 122 and use sauce type "A." Using this criteria and accounting for the speed of rotation of any given point on disc 12 using well known principles of kinematics, the preprogrammed PLC 54 initiates and variably maintains the spraying rate of nozzle 16 (by controlling the rate and/or activation and deactivation of pump 84), the rate of rotation of disc 12 and the rate of pivoting and direction of arm 14. In another example, such as for a different brand pizza, PLC 54 would be preprogrammed to start saucing at about three-quarters of an inch from outer edge 131 of the dough 122, and/or use sauce type "B." Finally, in another example, for thin pizza, PLC 54 would be preprogrammed to start saucing at the lip of dough 122, with one or more of sauce types "A" and "B", and/or additional sauce types. Of course, for each of the types of pizza, the starting location is achieved by pivoting arm 14. By using sensor 72 at vertical support 60 of dispensing arm 14, PLC 54 determines the position of arm 14 relative to outer edge of disc 12 and/or relative to center 42 of the tray 40.

Figure 6:
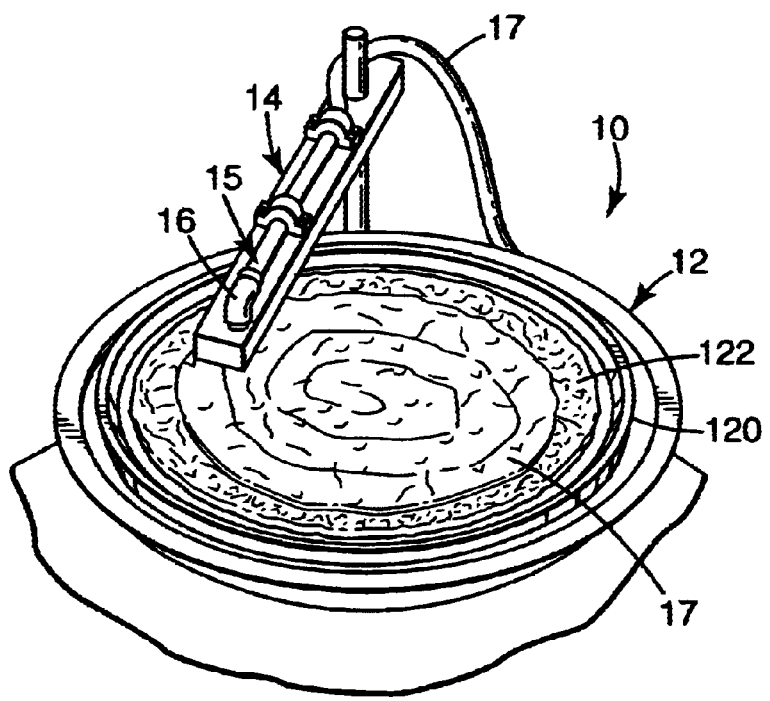
FIG. 6 is a perspective view of the dispenser of FIG. 1, according to an embodiment of the invention, and further incorporating a pizza pan with dough and sauce applied by the dispenser onto the dough.

As shown in FIG. 6 and using the above-described method with sauce dispensing system 10, sauce 17 is distributed evenly over the surface of dough 122 in the exact volume required and without manually handling the sauce or manually spreading the sauce on the dough. This technique is fast and prevents damage to dough since no mechanical force presses downwardly against dough 122.

Figure 7:
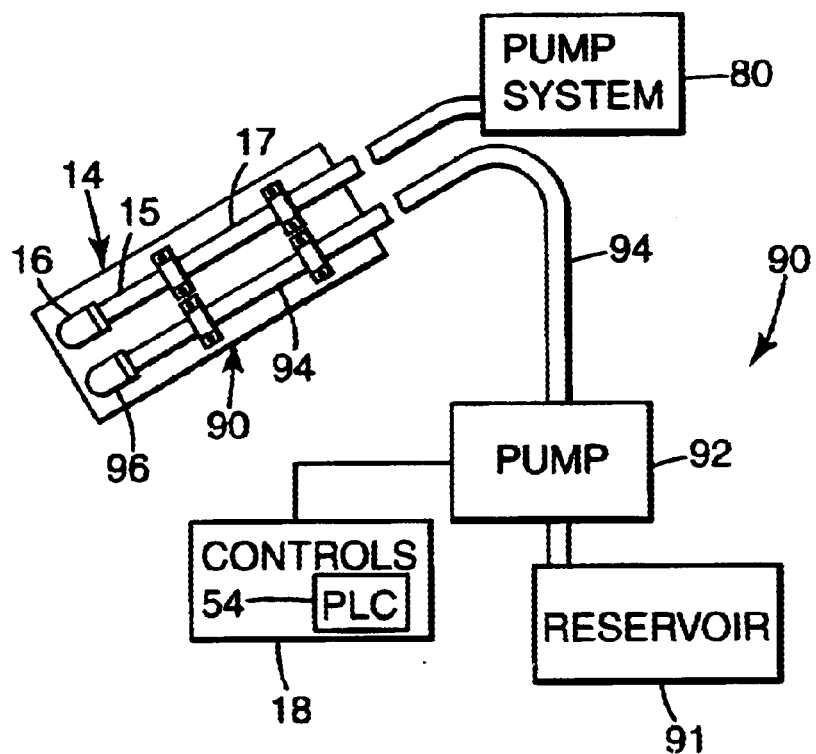
FIG. 7 is a schematic top view of an additional sauce pumping system, according to an embodiment of the invention.

FIG. 7 shows an optional second spraying mechanism 90 having reservoir 91, pump 92, hose 94, and nozzle 96. Second spraying mechanism 90 is in electrical and/or operative communication with controls 18, including PLC 54. Having second spraying mechanism 90, in addition to spraying mechanism 15, allows system 10 to instantaneously apply different types of sauces without changing nozzle 16, pump 84 or reservoir 82 of pump system 80. PLC 54 is programmed to selectively activate one or both of pump system 90 and pump system 80 to achieve the desired saucing. As seen in FIG. 7, spraying mechanisms 15 and 90, particularly nozzle 16 and 96 are arranged side by side on dispensing arm 14.

Of course, more than two spraying mechanisms can be used. For example, if a third or fourth type of sauce is available, a third and fourth spraying mechanism, or portions thereof (e.g. a nozzle or reservoir), can be operably connected to controls 18 and PLC 54 for selectively operating the extra spraying mechanisms. Moreover, if desired, two types of sauces can be applied to a dough base simultaneously or in succession, again without changing hardware or other features of the system.

Figure 8:
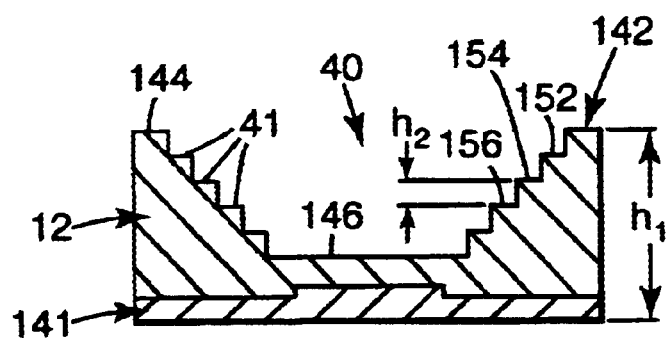
FIG. 8 is a cross-sectional view of a rotatable disc of a pizza sauce dispenser, according to an embodiment of the invention.

FIG. 8 shows, in greater detail, the nested concentrically arranged rings 41 of tray 40 according to one embodiment. In particular, disc 12 includes optional lower base 141 and removable upper tray 142. Tray 142 includes rim 144, center 146, and large-sized diameter ring 152, medium-sized diameter ring 154, and small-sized diameter ring 156. Tray 142 preferably has an overall height $h_1$ of about two and one-half inches to maintain a space saving low profile. Each ring 41 of tray 142 (e.g., ring 154) has a height $h_2$ (which may be the same as or different than other rings 41) to act as a border to contain the pizza pan that matches the diameter of that ring. Height $h_2$ is preferably 0.125 inches, according to one embodiment, to allow the entire tray 142 to have a low profile. Of course, a wide variety of dimensions are contemplated according to the invention, for this and other features described herein.

Tray 142 optionally is formed integrally with lower base 141. Tray 142, with or without base 141, is preferably removable from base 11 of system 10 to permit easy washing and maintenance of tray 142. Of course, tray 142 can be formed with any number of rings 41 (more or less than rings 152, 154, 156), with each ring 41 having a predetermined diameter that matches the diameter of an available pizza pan. Tray 142 is preferably made from a plastic material for easy and inexpensive manufacture, lightweight handling, and convenient washing, although other materials will be apparent for use, of course.

Figure 9:
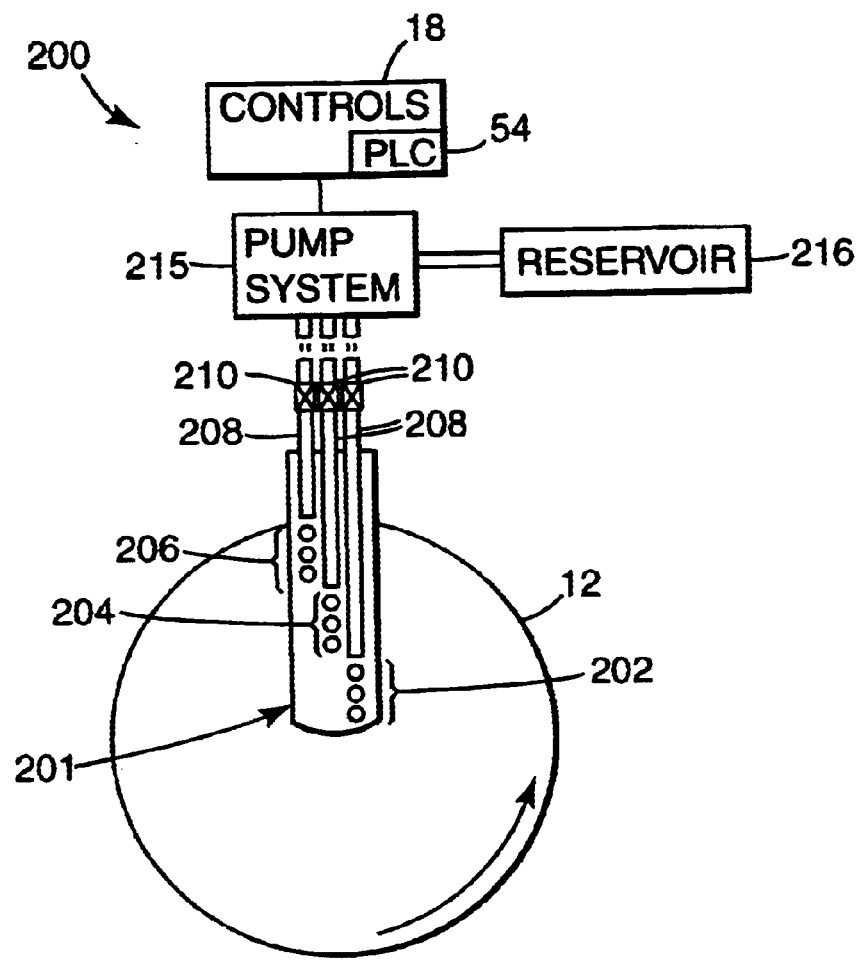
FIG. 9 is a schematic top view of a pizza sauce dispensing system including a stationary arm and multi-port nozzle, according to an embodiment of the invention.

FIG. 9 shows pizza sauce dispensing system 200, according to an alternate embodiment of the invention. System 200 uses rotatable disc 12 and includes stationary arm 201, inner multi-port nozzle 202, intermediate multi-port nozzle 204, and outer multi-port nozzle 206. Each nozzle 202, 204, 206 has its own hose 208 and solenoid 210. Of course, system 200 further includes controls 18 with PLC 54 and sauce pumping system 215 with reservoir 216 (similar to pump system 80) or other pumping systems known in the art. Sauce pumping system 215 is in fluid communication with each hose 208 to supply sauce to nozzles 202, 204, and 206. In addition, as previously described for sauce dispensing system 10, controls 18 with PLC 54 coordinate the rotation of disc 12, and activation/deactivation and spray rate of nozzles 202, 204, 206 to achieve the selected amount of sauce deposited at the selected thickness and spacing on the pizza crust.

In use, arm 201 is stationary while sauce is sprayed from nozzles 202, 204, and 206 as rotatable disc 12 rotates underneath arm 201. For pizzas having smaller diameters, only inner multi-port nozzle 202 is activated to spray sauce on disc 12 while disc 12 rotates through a single revolution. For pizzas with intermediate size diameters, both inner multi-port nozzle 202 and intermediate multi-port 204 are activated to spray sauce on disc 12 while disc 12 rotates through a single revolution. Finally, for pizzas with larger diameters, all three of the inner, intermediate and outer multi-port nozzles 202, 204, 206 are activated to spray sauce on disc 12 while disc 12 rotates through a single revolution. Of course, multiple revolutions instead of single revolutions are also contemplated according to the invention.

Figure 10:
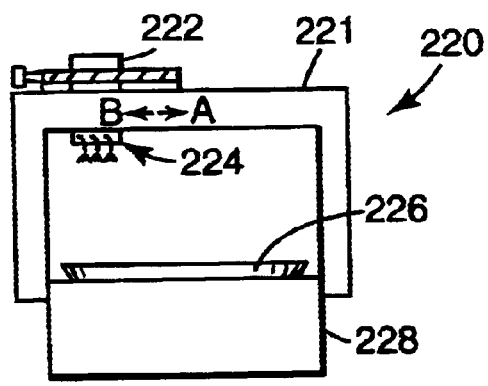
FIG. 10 is a schematic illustration of a pizza sauce dispensing arm, according to an embodiment of the invention.

FIG. 10 also schematically illustrates a sauce dispensing system 220, according to an alternate embodiment of the invention. System 200 includes stationary bracket 221, slidable member 222, nozzle 224, and rotatable disc 226. Nozzle 224 of system 220 is supplied with sauce from a pump and reservoir system (not shown) substantially similar to pumping system 80 as previously described in connection with FIG. 2. In this example, sauce is sprayed from nozzle 224 onto rotating disc 226 (with dough thereon), while slidable member 222 selectively slides along bracket 221 from an outer edge of disc 226 to a center of disc 226, and/or conversely from a center of disc 226 to its outer edge. This arrangement also causes sauce to be deposited in a spiral pattern onto dough on disc 226, if desired. In addition, as previously described for sauce dispensing system 10, controls 18 with PLC 54 coordinate the rotation of disc 226, sliding of member 222, and activation/deactivation and spray rate of nozzle 224 to achieve the selected amount of sauce deposited at the selected thickness and spacing on the pizza crust.

Figure 11:
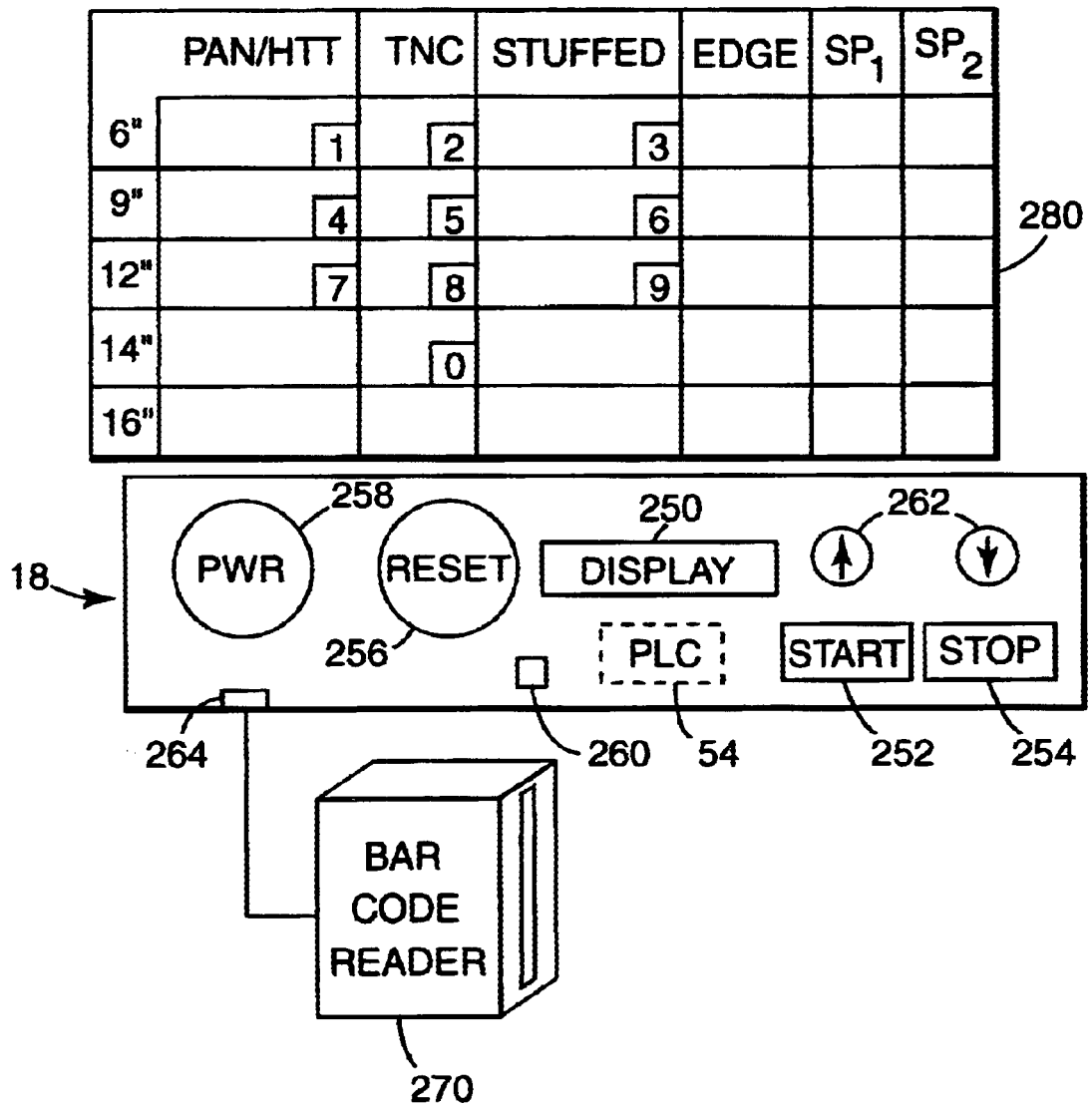
FIG. 11 is a schematic illustration of a control mechanism of a pizza sauce dispenser, according to an alternate embodiment of the invention.

Finally, controls 18, previously shown in FIG. 2, are further illustrated according to one embodiment in FIG. 11. Controls 18 include display 250, manual start 252, stop 254, reset 256, power 258, operation light 260, and program selection arrows 262. Controls 18 also include a communications port 264 (such as a RS232 or other known communication mode, e.g. Ethernet), and associated programming in PLC 54 for receiving and operating with optional bar code scanner 270. Finally, a membrane-type keypad 280 permits saucing a pizza by identifying a type of pizza sauce and size of pizza with the touch of a single button.

To operate system sauce dispensing system 10 using optional bar code scanner 270, a pizza dough to be sauced will carry a unique bar code ticket that identifies parameters such as a predetermined diameter, sauce type and dough type, or more simply that identifies a preprogrammed saucing operation for that type of pizza. An operator scans the bar code ticket using bar code scanner 270, thereby registering the selected parameters with the PLC, or identifying the preprogrammed saucing operation within PLC 54.

Updates or changes to programs for running saucing operations can be obtained online, e.g. through the Internet, according to one embodiment, and then downloaded into PLC 54. Of course, such updates or changes also can be supplied by disk, telephone modem or other known data-transfer devices and methods. Updates can include refinements in coordinating disc rotation and arm pivoting, and/or can include supplying a new set of parameters for applying sauce for a new size or type of pizza and/or type of sauce.

The programmable logic controller (PLC) 54 also permits counting the number of pizzas sauced and to be sauced, as well as recording their types, for coordination with e.g. cleaning or maintenance requirements for the system, reservoir replenishment, etc. Since this information can be displayed on display 250, these features greatly facilitate the preparation of a large number of pizzas having different characteristics.

Pizza sauce dispensing systems according to embodiments of the invention provide many advantageous features. First, such systems allow a precisely controlled amount of sauce to be deposited on a pizza dough, in a predetermined pattern, without manually handling the sauce during application and without manual spreading. Second, by using multiple pumping systems, embodiments of the invention permit at least two different sauces to be applied without requiring a change in a dispensing head, pump, or reservoir. Third, the programmable logic controller permits customization of sauce operations that are not practical with factory-type sauce dispensers, to permit saucing a high volume of pizzas while still accommodating different sized pizzas and different sauces. Finally, the sauce dispensing system saves space by allowing several types of pizza to be rapidly made in the space of a single pizza make table. Other advantages will be apparent to those of ordinary skill upon reading this disclosure.

While the invention has been described with reference to specific embodiments, the description is illustrative and is not to be construed as limiting the scope of the invention. For example, although embodiments of the invention have been described with respect to pizza, pizza sauce, pizza pans and pizza toppings, the invention is applicable to the preparation of other food items as well. Similarly, references to dough and dough bases should be interpreted to include other edible and inedible platforms for receiving food substances or other substances in the manner disclosed and contemplated herein. Other devices and methods according to the invention will be apparent to those of ordinary skill without departing from the spirit and scope of the invention.

What is claimed is:

1. A pizza sauce dispenser comprising:
    a disc rotatably mounted to a base for selective rotation at a predetermined rate;
    an arm pivotally mounted to the base for selectively disposing an end of the arm over the disc;
    a sauce dispensing mechanism having a nozzle disposed at the end of the arm and oriented toward the disc for selectively dispensing pizza sauce toward the disc as the arm pivots;
    a user interface operably coupled with the disc, arm and sauce dispensing mechanism, the user interface being constructed for manual contact by a user of the dispenser, the user interface being constructed such that the user can select a first type of pizza sauce by manually contacting a first key of the user interface, the user interface further being constructed such that the user can select a second type of pizza sauce by manually contacting a second key of the user interface, the second key being different than the first key; and
    a control mechanism, operably coupled with the user interface, wherein the control mechanism controls the disc, arm and sauce dispensing mechanism to dispense the first type of pizza sauce through the nozzle when the user manually contacts the first key, further wherein the control mechanism controls the disc, arm and sauce dispensing mechanism to dispense the second type of pizza sauce through the nozzle when the user manually contacts the second key, further wherein the control mechanism comprises a bar code scanner operatively coupled to the user interface for identifying a set of predetermined saucing parameters for a pizza to be sauced;
    wherein the first type of pizza sauce follows a flow path within the nozzle while being dispensed, further wherein the second type of pizza sauce follows the same flow path within the nozzle while being dispensed.

2. The dispenser of claim 1 wherein the dispensing mechanism further includes:
    a flexible hose extending from the nozzle; and
    a pump, connected to the hose and operatively coupled to a reservoir, adapted to hold a quantity of sauce to be drawn by the pump;
    wherein the pump is selectively actuated for controlling a predetermined amount and rate of sauce dispensed through the nozzle toward the disc.

3. The dispenser of claim 2 further comprising a drawback cylinder for maintaining the nozzle in a substantially clog-free and substantially drip-free state.

4. The dispenser of claim 2 wherein the dispensing mechanism further comprises a stepper motor operatively coupled to the pump for controlling a variable rate of flow of sauce through the nozzle.

5. The dispenser of claim 1 and further comprising:
    a second dispensing mechanism having a second nozzle disposed at the end of the arm and oriented toward the disc for selectively dispensing pizza sauce toward the disc.

6. The dispenser of claim 5 wherein the second dispensing mechanism further comprises:
    a second flexible hose extending from the second nozzle;
    a second pump connected to the second hose and operatively coupled to a second reservoir adapted to hold a quantity of sauce to be drawn by the second pump,
    wherein the second pump is selectively actuated for controlling a predetermined amount and rate of sauce dispensed through the second nozzle toward the disc.

7. The dispenser of claim 1, wherein the control mechanism is adapted to selectively activate, deactivate, and vary a rate of: (1) rotation of the disc; (2) pivoting of the arm; and (3) dispensing sauce through the nozzle.

8. The dispenser of claim 7 wherein the control mechanism further comprises a programmable logic controller for controlling activation, deactivation, and the rate of operation of the rotatable disc, pivotable arm, and the dispensing mechanism.

9. The dispenser of claim 8 wherein the programmable logic controller includes a stored program in a memory for identifying a pattern according to which sauce is dispensed on a predetermined size and shape pizza crust.

10. The dispenser of claim 9 wherein the stored program includes parameters comprising a total time and rate that sauce is to be dispensed through the dispensing mechanism, a total time and rate of rotation of the disc, and a total time, rate, and direction of pivoting of the arm.

11. The dispenser of claim 8 wherein the user interface comprises a membrane-type keypad and display for sending signals to the programmable logic controller.

12. The dispenser of claim 11 wherein the control mechanism further permits the functions of:
    counting a number of pizzas to be sauced;
    counting a number of pizzas that have been sauced;

starting a saucing operation;

terminating a saucing operation; and identifying a type and size of pizza to be sauced.

13. The dispenser of claim 1 wherein the disc comprises a removable tray having a plurality of nested concentric rings, each ring having a different elevation.

14. The dispenser of claim 13 wherein a ring at a center of the disc defines a lowest elevation of the concentric rings and has a smallest diameter of the concentric rings.

15. The dispenser of claim 13 wherein an outer rim of the disc defines a highest elevation of the concentric rings and has a largest diameter of the concentric rings.

16. The dispenser of claim 1, further comprising a stepper motor operatively coupled to the disc for causing rotation of the disc.

17. The dispenser of claim 1, further comprising a stepper motor operatively coupled to the arm for causing pivoting of the arm.

18. The dispenser of claim 17, further comprising a sensor operatively coupled to the motor and the pivoting arm to facilitate controlling a rate and direction of pivoting of the arm.

19. The dispenser of claim 18 wherein the arm further comprises:

a vertical support secured relative to the motor and in close proximity to the sensor; and a horizontal member extending from the vertical support in a generally perpendicular relationship to extend over the rotatable disc and supporting the nozzle wherein the end of the arm is the end of the horizontal member.

20. The dispenser of claim 1 wherein the control mechanism is adapted to control the dispenser to dispense pizza sauce through the nozzle as the arm pivots from an outer portion of the disc toward a central portion of the disc and as the disc rotates.

21. The dispenser of claim 20 wherein the control mechanism is adapted to control the dispenser to decrease the flow rate of sauce dispensed through the nozzle when the arm is at the central portion of the disc and to increase the flow rate of sauce dispensed through the nozzle when the arm is at the outer portion of the disc.

22. The dispenser of claim 21 wherein the nozzle is a single nozzle.

23. The dispenser of claim 20 wherein the control mechanism is adapted to control the dispenser to dispense pizza sauce through the nozzle as the arm pivots from the central portion of the disc towards the outer portion of the disc.

24. The dispenser of claim 23 wherein the control mechanism is adapted to control the dispenser to decrease the flow rate of sauce dispensed through the nozzle when the arm is at the central portion of the disc and to increase the flow rate of sauce dispensed through the nozzle when the arm is at the outer portion of the disc.

25. The dispenser of claim 24 wherein the nozzle is a single nozzle.

26. The dispenser of claim 1, wherein the user interface is constructed such that the user can select the first type of pizza sauce, a first dough base size, and a first volume of pizza sauce by manually contacting a single first key of the user interface, the user interface further being constructed such that the user can select the second type of pizza sauce, a second dough base size, and a second volume of pizza sauce by manually contacting a single second key, the single second key being different than the single first key; and wherein the control mechanism controls the disc, arm and sauce dispensing mechanism to dispense the first type of pizza sauce and the first volume of pizza sauce through the nozzle when the user manually contacts the single first key, further wherein the control mechanism controls the disc, arm and sauce dispensing mechanism to dispense the second type of pizza sauce and the second volume of pizza sauce through the nozzle when the user manually contacts the single second key.

27. A pizza sauce dispenser comprising:

a selectively rotatable disc for supporting a pizza dough base;

an arm selectively pivotable with respect to the disc;

a first spray mechanism mounted on the arm and being selectively actuable for spraying a first sauce onto the dough base at a predetermined rate as the arm pivots;

a second spray mechanism mounted on the arm and being selectively actuable independently of the first spray mechanism for spraying a second sauce onto the dough base at a predetermined rate;

a user interface operably coupled with the disc, arm, first spray mechanism and second spray mechanism, the user interface being constructed for manual contact by a user of the dispenser, the user interface being constructed such that the user can select the first sauce by manually contacting a first key of the user interface, the user interface further being constructed such that the user can select the second sauce by manually contacting a second key of the user interface, the second key being different than the first key;

a control mechanism, operably coupled with the user interface, wherein the control mechanism controls the disc, arm, and first spray mechanism to dispense the first sauce through the first spray mechanism when the user manually contacts the first key, further wherein the control mechanism controls the disc, arm and second spray mechanism to dispense the second sauce through the second spray mechanism when the user manually contacts the second key, further wherein the control mechanism comprises a bar code scanner operatively coupled to the user interface for identifying a set of predetermined saucing parameters for a pizza to be sauced;

a motor operatively coupled to the arm and the control mechanism for causing pivoting of the arm; and a sensor operatively coupled to the control mechanism and to the arm to facilitate controlling a rate and direction of pivoting of the arm.

28. The pizza sauce dispenser of claim 27, wherein the control mechanism is adapted to selectively activate, deactivate and vary a rate of (1) rotation of the disc; (2) pivoting of the arm; and (3) spraying sauce through the first spray mechanism and the second spray mechanism.

29. The dispenser of claim 27 wherein the control mechanism is adapted to control the dispenser to spray first sauce through the first spray mechanism as the arm pivots from an outer portion of the dough base toward a central portion of the dough base and as the disc rotates.

30. The dispenser of claim 29 wherein the control mechanism is adapted to control the dispenser to decrease the flow rate of first sauce sprayed through the first spray mechanism when the arm is at the central portion of the dough base and to increase the flow rate of first sauce sprayed through the first spray mechanism when the arm is at the outer portion of the dough base.

31. The dispenser of claim 30 wherein the first spray mechanism comprises a single nozzle.

32. The dispenser of claim 29 wherein the control mechanism is adapted to control the dispenser to spray first sauce through the first spray mechanism as the arm pivots from the central portion of the dough base towards the outer portion of the dough base.

33. The dispenser of claim 32 wherein the control mechanism is adapted to control the dispenser to decrease the flow rate of fist sauce dispensed through the first spray mechanism when the arm is at the central portion of the dough base and to increase the flow rate of first sauce dispensed through the first spray mechanism when the arm is at the outer portion of the dough base.

34. The dispenser of claim 33 wherein the first spray mechanism comprises a single nozzle.

35. The dispenser of claim 27, wherein the user interface is constructed such that the user can select the first sauce, a first dough base size, and a first volume of sauce by manually contacting a single first key of the user interface, the user interface further being constructed such that the user can select the second sauce, a second dough base size, and a second volume of sauce by manually contacting a single second key, the single second key being different than the single first key; and
   wherein the control mechanism controls the disc, arm and first spray mechanism to dispense the first sauce and the first volume of sauce through the nozzle when the user manually contacts the single first key, further wherein the control mechanism controls the disc, arm and second spray mechanism to dispense the second sauce and the second volume of sauce through the nozzle when the user manually contacts the single second key.

36. The dispenser of claim 27, wherein the arm comprises:
   a vertical support secured relative to the motor and in close proximity to the sensor; and
   a horizontal member extending from the vertical support in a generally perpendicular relationship to extend over the rotatable disc and supporting the first spray mechanism and the second spray mechanism, wherein the end of the arm is the end of the horizontal member.

37. A pizza sauce dispenser comprising:

a disc rotatably mounted to a base for selective rotation at a predetermined rate;

an arm pivotally mounted to the base for selectively disposing an end of the arm over the disc;

a sauce dispensing mechanism having at least one nozzle disposed at the end of the arm and oriented toward the disc for selectively dispensing pizza sauce toward the disc; and a control mechanism for selectively activating, deactivating, and varying a rate of: (1) rotation of the disc; (2) pivoting of the arm; and (3) dispensing sauce through the nozzle, the control mechanism comprising a programmable logic controller for controlling activation, deactivation, and the rate of operation of the rotatable disc, pivotable arm, and the dispensing mechanism;

wherein the control mechanism further comprises a bar code scanner operatively coupled to the programmable logic controller for identifying a set of predetermined saucing parameters for a pizza to be sauced.

38. The dispenser of claim 37, wherein the sauce dispensing mechanism is adapted to selectively dispense pizza sauce toward the disc as the arm pivots.

* * * * *